US011323662B2

(12) United States Patent
Vamos et al.

(10) Patent No.: US 11,323,662 B2
(45) Date of Patent: *May 3, 2022

(54) SPECIAL EFFECTS COMMUNICATION TECHNIQUES

(71) Applicant: Universal City Studios LLC, Universal City, CA (US)

(72) Inventors: Clarisse Marie Vamos, Orlando, FL (US); Bradford Ross Benn, Orlando, FL (US); Grace Catheryn Haynes, Orlando, FL (US); Ryan Michael Paul, Orlando, FL (US); Justin Allen Hare, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/075,262

(22) Filed: Oct. 20, 2020

(65) Prior Publication Data
US 2021/0037212 A1 Feb. 4, 2021

Related U.S. Application Data

(63) Continuation of application No. 16/414,564, filed on May 16, 2019, now Pat. No. 10,841,536.
(Continued)

(51) Int. Cl.
*H04N 7/15* (2006.01)
*G06K 9/46* (2006.01)
(Continued)

(52) U.S. Cl.
CPC ............. *H04N 7/157* (2013.01); *A63J 5/023* (2013.01); *A63J 5/025* (2013.01); *A63J 21/00* (2013.01);
(Continued)

(58) Field of Classification Search
USPC .............................................. 348/14.02–14.9
See application file for complete search history.

(56) References Cited

U.S. PATENT DOCUMENTS 3,655,272 A 4/1972 Valadez
5,719,561 A 2/1998 Gonzales
(Continued)

FOREIGN PATENT DOCUMENTS

CN 2703581 Y 6/2005

OTHER PUBLICATIONS

Stephen Diverdi et al., "An Immaterial Pseudo-3D Display with 3D Interaction," Three-Dimensional Television, Jan. 1, 2008, pp. 1-26.
(Continued)

*Primary Examiner* — Maria El-Zoobi
(74) *Attorney, Agent, or Firm* — Fletcher Yoder, P.C.

(57) ABSTRACT

A special effects communication system may include a camera system at a first location that generates a first dataset based on one or more images or impressions of a first user at the first location. The special effects communication system may also include a control system communicatively coupled to the camera system and a special effects system. The control system may receive a second dataset corresponding to a second user present at a second location or to one or more users at one or more locations while the first user is present at the first location. The control system may also provide one or more control signals to cause the special effects system at the first location to generate special effects to present a visual and/or auditory likeness of the second user using special effects material and/or mediums.

22 Claims, 5 Drawing Sheets

Related U.S. Application Data

(60) Provisional application No. 62/738,767, filed on Sep. 28, 2018.

(51) Int. Cl.
  *H04N 7/14* (2006.01)
  *A63J 21/00* (2006.01)
  *H04N 9/31* (2006.01)
  *A63J 5/02* (2006.01)

(52) U.S. Cl.
  CPC ............ *G06K 9/46* (2013.01); *H04N 7/147* (2013.01); *H04N 9/3179* (2013.01)

(56) References Cited

U.S. PATENT DOCUMENTS

| | | | |
|---|---|---|---|
| 8,567,954 | B2 | 10/2013 | Koehler et al. |
| 2004/0130614 | A1 | 7/2004 | Valliath et al. |
| 2009/0309955 | A1* | 12/2009 | Gladstone ......... H04M 3/42374 348/14.04 |
| 2011/0037952 | A1 | 2/2011 | LaDuke et al. |
| 2011/0141220 | A1 | 6/2011 | Miura |
| 2012/0038739 | A1 | 2/2012 | Welch et al. |
| 2012/0062799 | A1* | 3/2012 | Apostolopoulos ....... H04N 5/21 348/609 |
| 2013/0324271 | A1 | 12/2013 | Stoker |
| 2015/0170394 | A1* | 6/2015 | Lee ....................... G06T 19/003 345/419 |
| 2017/0013251 | A1 | 1/2017 | Thigpen |
| 2017/0264863 | A1* | 9/2017 | Sakarya ............... H04N 13/388 |
| 2018/0054720 | A1* | 2/2018 | Messenger ........ H04M 3/53333 |

OTHER PUBLICATIONS

Yutaka Tokuda et al., "Towards Mobile Embodied 3D Avatar as Telepresence Vehicle," Universal Access in Human-Computer Interaction, Jul. 21, 2013, pp. 671-680.

PCT/US2019/051766 International Search Report and Written Opinion dated Nov. 29, 2019.

* cited by examiner

SPECIAL EFFECTS COMMUNICATION TECHNIQUES

CROSS REFERENCE TO RELATED APPLICATION

This application is a continuation of U.S. Non-Provisional application Ser. No. 16/414,564, entitled "Special Effects Communication Techniques," filed on May 16, 2019, which claims priority from and the benefit of U.S. Provisional Application Ser. No. 62/738,767, entitled "Special Effects Communication Techniques," filed Sep. 28, 2018, which is hereby incorporated by reference in its entirety for all purposes.

BACKGROUND

The present disclosure relates generally to communication techniques, and, more specifically, to systems and methods for providing an immersive and/or transformative communication experience to users of the communication system.

Many communication systems permit a first user to communicate with a second user at a different location. Over the course of a conversation, the first user may speak with the second user, and in some cases, may visually and aurally communicate with the second user via audio and video communication devices. Even though a communication system permits these users to communicate with each other, the communication system may not provide an immersive communication experience to the users. With the increasing sophistication and complexity of modern electronics and communication techniques, improved and more immersive and/or transformative communication experiences are desirable.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a special effects communication system may include a camera system at a first location that generates a first dataset based on one or more images of a first user at the first location. The special effects communication system may also include a special effects system that generates special effects using a special effects material at the first location. The special effects communication system may also include a control system communicatively coupled to the camera system and the special effects system. The control system may receive a second dataset corresponding to a second user present at a second location while the first user is present at the first location. The control system may also provide one or more control signals based to cause the special effects system at the first location to generate the special effects to present a likeness of the second user using the special effects material.

In another embodiment, a special effects communication system may include a camera system that captures one or more images of a first user at a first location and communication circuitry. The communication circuitry may transmit a first dataset corresponding to the one or more images of the first user and receive a second dataset from a destination device corresponding to one or more images of a second user at a second location. The special effects communication system may also include a special effects system that generates one or more control signals based on the second dataset to drive three-dimensional manipulation of a physical medium to present a likeness of the second user.

In yet another embodiment, a method may include capturing a first dataset including first audio data and first image data associated with the first location and establishing a communication link with an origin device or a central device that controls all effects systems. The method may also include transmitting the first dataset to the origin device, and while transmitting the first dataset, receiving a second dataset including second audio data and second image data associated with a second location.

The method may also include generating one or more control signals based at least in part on the second dataset and driving a three-dimensional manipulation of a physical medium based at least in part on the one or more control signals.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
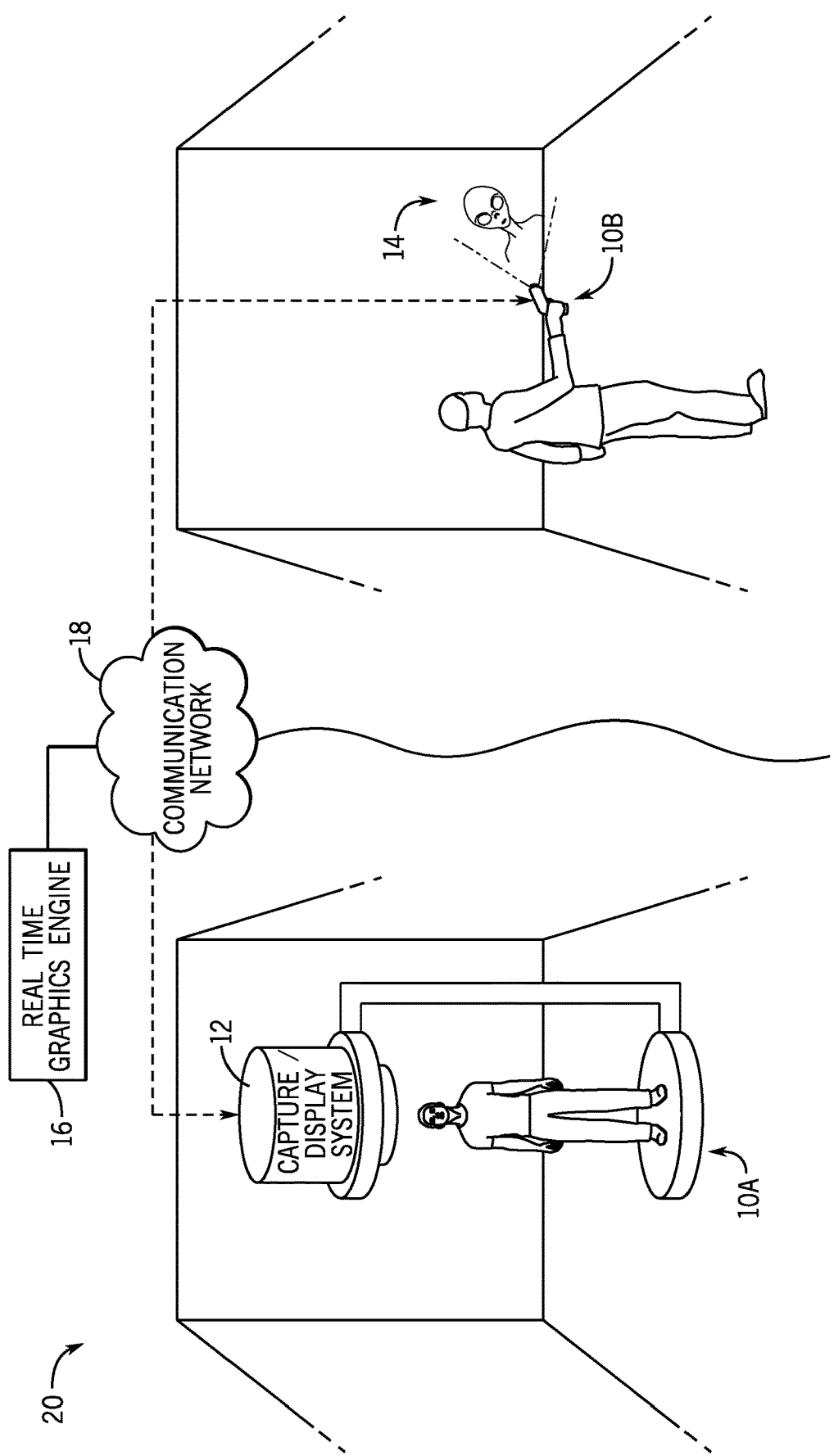
FIG. 1 is an illustration of a first special effects communication system transmitting a likeness of a first user to a second special effects communication system receiving and displaying the likeness of the first user in conjunction with one or more special effects, in accordance with aspects of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Communication systems may include a wide variety of communication experiences, such as instant messaging capabilities, the ability to add emoticons into sentences to convey a feeling or emotion, video communication options, or the like. These different communication experiences may enhance user experiences with the communication system. For example, the emoticons may facilitate emotional communication via mere text-based communication systems, enhancing the user experience with the communication system through enhancing a conversation between the user and a different user. However, these communication systems may continue to provide sub-immersive communication experiences. Accordingly, it may be desirable to provide an immersive and/or transformative communication experience to users of communication system to improve quality of conversations between the users and overall user experiences.

Accordingly, the present disclosure relates to systems and methods that utilize material actuation, sensor data, and/or special effects to improve conversation quality and enhance a user experience between users of communication systems. More particularly, the present disclosure relates to a special effects communication system that includes one or more capturing and displaying systems (e.g., image, video or spatial capture system, projection system). The capturing and projection systems may facilitate improving conversation quality between users and may immerse a first user in the respective environment of a second user they are communicating with. By immersing users into the environments of those with whom they are communicating, a first user at a first location may experience at least in part the illusion of being immersed in a second location corresponding to a second user with whom they are in conversation. In this manner, the second user may receive a projection or impression of the first user to improve communication and immerse the second user further into the conversation (e.g., by making the second user believe at least in part that the first user is in the environment interacting with the second user). For example, if the first user is in a meadow, the second user may experience not only the sights and sounds of the meadow using audio/video communication, but the special effects communication system may also trigger wind and olfactory effects for the second user that provide the illusion that a part of the first user's environment has traveled along with them and that the first user is physically present and not merely visible via audio/visual display at a remote location.

In one embodiment, a special effects communication system at an origin establishes a communication link with a destination device (e.g., a second special effects communication system). In response to the established communication link, one or both of the origin special effects communication system or the destination special effects communication system may transmit audio data, image data, and, in embodiments, additional sensor data to one another to convey and communicate a likeness of their respective users (e.g., visual depiction and associated audio and/or environmental conditions). The audio data is transmitted and presented (e.g., played aloud) substantially simultaneously with the image data and in conjunction with one or more special effects to provide an immersive and/or transformative communication experience to one or both users of the special effects communication system. Further, the likeness of one or both of the users (i.e., origin or destination) may be displayed or projected in a manner that enhances a concurrent special effect. For example, the likeness of the users of the special effects communication system may be generated at the origin or destination device through manipulating fire, water, fog, putty, a volumetric display, and/or a holographic display, or any suitable physical material or medium, to present the likeness to the user of the destination device. In these examples, the additional sensor data and/or the special effect generated by the special effects communication system may convey a temperature or quality of the physical medium, such as mist and cool air for water or warm air and additional audio (e.g., crackling) for fire. In addition, some embodiments may generate a variety of control signals based on the image data. The control signals may be used to manipulate the physical mediums and/or for actuation of components. For example, multiple pins or air bladders (e.g., air contained within plastic) may be actuated and changed in response to the control signals, where, in some embodiments, the multiple pins or air bubbles are sheathed with a flexible and/or elastic material (e.g., a rubber skin, fabric, leather). In this way, the flexible material is formed and appears to move in response to the control signal-based actuations and may be used to communicate motions (e.g., associated with head movements and/or facial expressions, associated with speaking) associated with the user of the special effects communication system to provide the illusion of speaking with an avatar of the user rendered in a physical medium.

As may be appreciated, in some embodiments, the destination device may not have a user and thus a likeness of ambient surroundings to the destination device may be transmitted to the special effects communication system. For example, a likeness associated with an empty room may be transmitted to the special effects communication system for presentation to the corresponding user. As also may be appreciated, the special effects communication system that initiates the communication linking may not present a special effect. Instead, the special effects communication system acting as the destination device may present the special effect.

In certain embodiments, the disclosed special effects communication system is provided within an entertainment venue, such as an amusement or theme park. Theme parks provide controlled environments that may be associated with memorable effects that enhance an immersive and/or transformative experience. That is, a particular attraction environment may have ice, fire, smoke, light, and other sensory thematic elements that are recreated at least in part for a user of the special effects communication system to provide the user with a feeling of being in the environment and/or communicating with an individual in the environment. Accordingly, certain embodiments of the disclosure are disclosed in the context of special effects that are part of an entertainment narrative and that enhance an immersive and/or transformative entertainment experience for a user. In one embodiment, a user may adopt a character associated with an attraction within the theme park, such as an alien having different physical features and operating in a fictional planetary environment. Accordingly, the communication effects and the special effects are selected and operate in concert to enhance the desired narrative. It should be understood that the communication effects and the special effects may be selected to fit other narrative environments and that the depicted alien narrative is by way of example only.

Turning now to the drawings, FIG. 1 is an illustration of an embodiment of a system 20 that includes one or more special effects communication systems 10 (e.g., a first special effects communication system 10A). The first special effects communication system 10A may include one or more capture and display systems 12 (e.g., capture/display systems 12) that capture a likeness of a first user located at the location of the first special effects communication system 10A and for transmission to a second special effects communication system 10B. In the depicted example, the first user is positioned on a platform that enhances a narrative that the first user will be transported to a second location. The second special effects communication system 10B at the second location may receive a dataset indicative of the likeness of the first user and may operate to present an image 14, using the dataset, displaying or otherwise communicating the likeness of the first user to a second user. The image 14 may be presented in concert with a supporting special effect as provided herein. Further, depending on the desired narrative or illusion effect, the system 20 may process or change the likeness to present an illusion to the second user. For example, the image may present features of the first user's face that are stretched or fading away at the edges to enhance an illusion of a holographic display or the user being transported into a light beam. In other embodiments, the displayed image may be based on extracted facial features from the first user. The system 20 may incorporate these extracted features a part of a desired character avatar (e.g., a character from a narrative) that resembles the user. Certain character avatars may be associated with particular special effects, such as appearing/disappearing in a puff of smoke, and the combination of the display of the image of the avatar and the triggering of the special effect (e.g., release of smoke around a projection) may enhance certain narrative features of the communication. In the depicted embodiment, the user is rendered or presented as an alien at the destination-side or second special effects communication system 10B and surrounded by a fog beam special effect.

The likeness of the first user transmitted from the first special effects communication system 10A to the second special effects communication system 10B may include any suitable digital data and/or analog data to communicate a visage and/or presence of the first user, including, but not limited to, image data, audio data, sensor data, or the like. In this manner, the image data corresponding to the first user may be transmitted by the second special effects communication system 10B substantially simultaneously to audio data, sensor data, or any other suitable digital data and/or analog data to communicate the visage and/or presence of the first user to the second user. Likewise, the second special effects communication system 10B may capture and transmit a likeness of the second user to the first user.

As depicted, the first user is positioned within or adjacent to the first special effects communication system 10A. In response to detecting the presence of the first user, the first special effects communication system 10A may establish a communication link (e.g., initiated communication) with the second special effects communication system 10B. When the communication link is established between special effects communication systems 10, likenesses of one or both of the users are transmitted between the special effects communication systems 10. In this way, the first special effects communication system 10A receives data associated with the likeness of the second user while transmitting the likeness of the first user to the second special effects communication system 10B. Data transmitted between special effects communications systems 10 (e.g., 10A, 10B) may include data used to provide special effects, such as temperature sensor data to communicate to one of the users an ambient environmental temperature corresponding to a location of each respective user. Other examples of data that may be provided as input to a special effects subsystem may include position tracking data, humidity or moisture data, pressure data, any suitable data to communicate environmental conditions, or the like.

The first special effects communication system 10A and the second special effects communication system 10B may transmit one or more datasets via a real time graphics engine 16C of the system 20. The one or more datasets may also include a variety of suitable metadata, including a destination identifier, a source identifier, an illusion identifier, or the like to facilitate the transmission and/or processing of the dataset to provide the immersive and/or transformative entertainment experience for one or more users. The real time graphics engine 16C, the first special effects communication system 10A, and/or the second special effects communication system 10B may each include processing circuitry and memory circuitry to process the one or more datasets sent between the special effects communication systems 10. The processing circuitry may be used to run programs, execute instructions, interpret input, generate control signals, and/or other similar functions. The memory circuitry may be used to store data, programs, instructions, and so forth. In other embodiments, the processing and memory functionality may be resident at least in part on a central controller. In addition, the special effects communication systems 10 may, in some embodiments, each include a respective of the real time graphics engines 16 (e.g., 16A, 16B). In this way, one of the special effects communication systems 10 may use the real time graphics engines 16 to alter, process, modify, adjustment, or the like the one or more datasets before transmitting the one or more datasets to the other of the special effects communication systems 10.

Datasets (e.g., audio data, image data, and additional sensor data) may be transmitted between components via a communication network 18. The communication network 18 may include any number of input/output (I/O) interfaces and/or network interfaces. Such a communication network may enable data transmission over a variety of wired or wireless networks such as personal area network (PAN) such as Bluetooth, a local area network (LAN) or wireless local area network (WLAN) such as Wi-Fi, and/or for a wide area network (WAN) such as a cellular network. In some embodiments, memory circuitry of the second special effects communication system 10B may store one or more datasets for a duration of time before transmitting the datasets to the first special effects communication system 10A. In this way, in some embodiments, the first special effects communication system 10A may provide a pre-recorded listening and/or viewing experience to a user of the first special effects communication system 10A.

In some embodiments, the second special effects communication system 10B includes a special effects system that uses a special effects material (e.g., a physical material) to generate the likeness of the first user onto, into, or out of or to create the likeness of the first user. Data associated with providing the three-dimensional likenesses of the first user via the second special effects communication system 10B may be generated by the first special effects communication system 10A or by a real time graphics engine 16 and transmitted to the second special effects communication system 10B, or generated in real-time by the second special effects communication system 10B in response to received data from the first special effects communication system 10A. For example, the second special effects communication system 10B may receive one or more control signals to manipulate the physical material, such as changing an output of lasers or fog to generate a depiction of the first user. As depicted, the second special effects communication system 10B provides a depiction of the first user projected into a fog screen or fog beam, however it should be understood that any suitable physical material may be used in combination with a light output (e.g., a projection system) to provide a three-dimensional or two-dimensional image of the first user. For example, fire, water, fog, smoke, putty, or the like may be used as the physical material. In general, a likeness of the first user and/or the second user may be modified as part of one or more illusions based on one or more images and/or impressions of the users.

Figure 2:
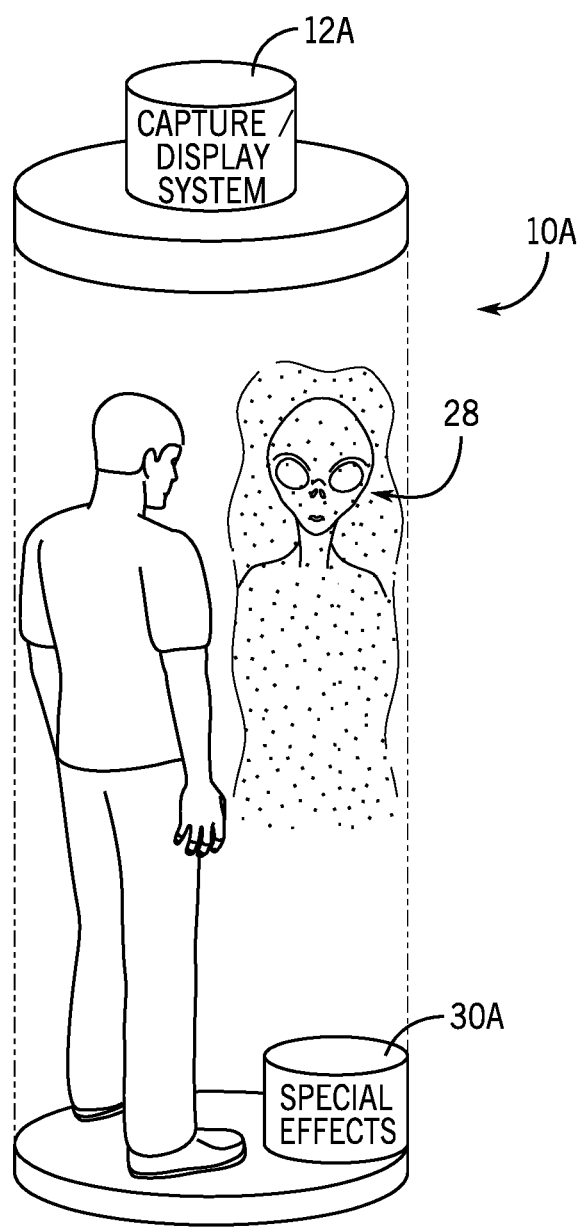
FIG. 2 is an illustration of the first special effects communication system of FIG. 1 receiving and displaying a likeness of second user while transmitting the likeness of the first user in conjunction with one or more special effects, in accordance with aspects of the present disclosure.

FIG. 2 illustrates an example of the first special effects communication system 10A taken generally from the perspective of the first user. As depicted, the first special effects communication system 10A has already established a communication link with the second special effects communication system 10B and thus is receiving a likeness of the second user. As discussed above, while receiving the likeness of the second user, the first special effects communication system 10A simultaneously captures and transmits the likeness of the first user through transmitting data gathered from a combination of camera sensors, audio sensors, and any suitable additional sensors.

The first special effects communication system 10A may receive and transmit audio data, image data, and/or additional sensor data to receive and transmit the likeness of the users. The audio data may be interpreted by processing circuitry internal to the first special effects communication system 10A, or other suitable circuitry communicatively coupled to the first special effects communication system 10A through the communication network 18. Upon receiving the audio data, the first special effects communication system 10A may process (e.g., to improve signal integrity or prepare the audio data for output) and present the audio data (e.g., via a speaker) to the first user to facilitate communication between the first user and the second user. The processing facilitates an illusion based on the likeness of the second user to be presented to the first user. In this way, as depicted, the second user (e.g., a human) is depicted to the first user as an illusion or in a distorted manner (e.g., an alien that is not a human, having distorted or different features, such as having an effected voice, emitting one or more non-human sounds, produced from filtering, speech recognition transliteration, or the like).

Similarly, the image data may be received and/or interpreted by processing circuitry internal the first special effects communication system 10A, or other suitable circuitry communicatively coupled to the first special effects communication system 10A through the communication network 18, such as the real time graphics engine 16. This processing circuitry may receive the image data and generate one or more controls signals to cause the presentation of the likeness of the second user to the first user (e.g., presentation example 28). These control signals may control pixels, projection systems, physical mediums, or the like to permit the presentation of the likeness of the second user into, onto, or out of any suitable physical material or light. In addition, these control signals may be generated based at least in part on the additional sensor data. For example, additional sensor data may communicate an orientation of the second user relative to a capture/display system 12B of the second special effects communication system 10B and thus may be used to change how the likeness of the second user is presented to the first user. The additional sensor data may also be used to facilitate a special effect within the first special effects communication system 10A, such as to dynamically adjust a temperature output associated with mist generated to touch the first user.

As depicted, the capture/display system 12A captures one or more images of the first user while within or near proximity of the first special effects communication system 10A. The first special effects communication system 10A simultaneously transmits and receives audio data, image data, and/or additional sensor data to enable the first user to communicate with the second user. In response to the received image data and additional sensor data, a capture/display system 12A of the first special effects communication system 10A operates to present the likeness of the second user substantially simultaneously to outputting audio data from the second user. In addition, a special effects system 30A may output substantially simultaneously one or more special effects during the output of the received audio data and image data, where the one or more special effects facilitate communication of an ambient environment at a location to the first user. In this way, the first special effects communication system 10A operates to provide an immersive and/or transformative communication experience to the first user. The special effects system 30 may drive manipulation of a special effects material or a physical medium (e.g., water, fog, smoke, fire, putty, etc.) and in conjunction with other sensory effects, such as tactile, light, and/or sound effects that enhance the desired illusion.

Figure 3:
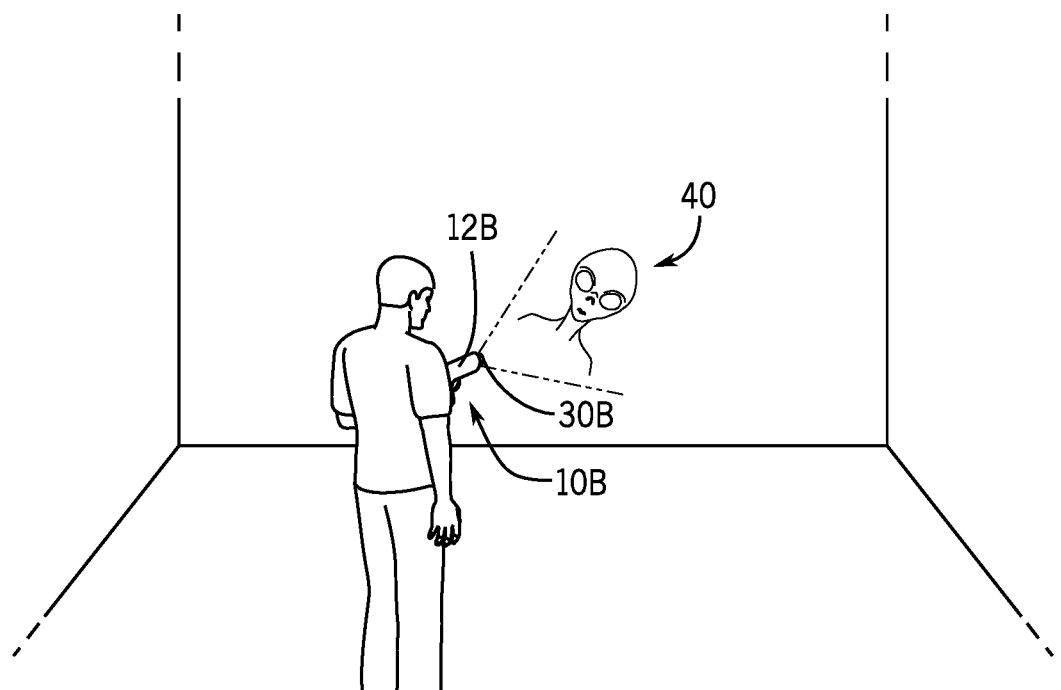
FIG. 3 is an illustration of the second special effects communication system of FIG. 1 receiving the likeness of the first user while transmitting a likeness of the second user in conjunction with one or more special effects, in accordance with aspects of the present disclosure.

While the first user is using the first special effects communication system 10A, the second user may use the second special effects communication system 10B. FIG. 3 is an illustration of an example of the second special effects communication system 10B taken generally from the perspective of the second user. As depicted, the second special effects communication system 10B has already established a communication link with the first special effects communication system 10A and thus is receiving a likeness of first user. As discussed above, while receiving the likeness of the first user, the second special effects communication system 10B simultaneously captures and transmits the likeness of the second user through transmitting data gathered from a combination of camera sensors, audio sensors, and any suitable additional sensors.

The second special effects communication system 10B may include a capture and display system 12B and a special effects system 30B. Although both special effects communication systems 10 may include special effects systems 30, it should be understood that at any given time, the special effect may be carried with the likeness of one user. A special effect may be transmitted to the first user at the same time as a projection into, onto, or out of a physical medium is presented to the second user. In some embodiments, one or more special effects may be simultaneously transmitted via each special effects communication system 10. Thus, in some embodiments, both special effects communication systems 10 may not simultaneously transmit special effects to the respective user. However, in some embodiments, both special effects communication systems 10 may simultaneously transmit one or more special effects to the respective user, where the one or more special effects may be the same or different.

As depicted, the special effect described in FIG. 2 is presented substantially simultaneously to the projection of the first user into, onto, or out of a physical medium being presented to the second user depicted in FIG. 3. The second special effects communication system 10B presents an illusion (e.g., an alien) based on the likeness of the first user to the second user through a presentation technique, such as, a manipulation of fog. In this way, a three-dimensional illusion of the likeness of the first user is transmitted via image projection onto an illuminated cone of fog (e.g., presentation example 40) or a fog screen. Although depicted as performing an image projection onto the illuminated cone of fog, as will be appreciated, any suitable projection and/or presentation method and/or technique may be used to provision a likeness of the first user via the second special effects communication system 10B.

Referring now to FIG. 2 and FIG. 3, the presentation example 40 may occur substantially contemporaneously as the presentation example 28 of FIG. 2. Meaning that, while the second user of FIG. 3 is seeing a three-dimensional projection of the first user, for example, the first user sees a two-dimensional projection of the second user transmitted via an array of light projected onto a water curtain. The two-dimensional projection may be transmitted at the same time as a special effect, such as additional audio or a light breeze (e.g., initiated by one or more fans in response to control signals). Additional sensor data may be used to track an orientation of the first user such that when the first user moves their head or body, the three-dimensional projection of FIG. 3 moves substantially simultaneously with the first user motions. The combination of the special effect, the two-dimensional projection, and the three-dimensional projection may immerse both users further into their conversation and thus may improve and/or enhance conversation.

Figure 4:
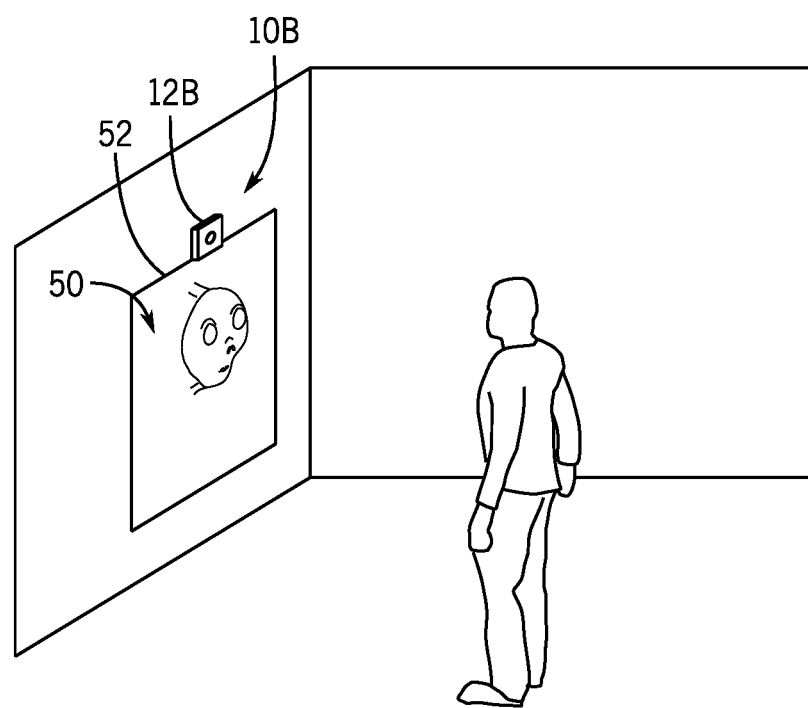
FIG. 4 is an illustration of an embodiment of the second special effects communication system of FIG. 1 receiving and displaying the likeness of the first user while transmitting a likeness of the second user in conjunction with one or more special effects, in accordance with aspects of the present disclosure.

FIG. 4 is an illustration of another example of the second special effects communication system 10B taken generally from the perspective of the second user. This example of the second special effects communication system 10B depicts a three-dimensional illusion presentation example 50 of the first user emerging from of a wall-mounted projection system 52. The three-dimensional illusion presentation example 50 is based on a captured likeness of the first participant. The capture/display system 12B may manipulate the datasets associated with the captured likeness to convey an illusion of a different appearance. In this example, the first user (e.g., a human) is turned into an alien, or other suitable illusion, for presentation to the second user (e.g., a human). As discussed above, in some embodiments, the second special effects communication system 10B includes one or more items associated with controllable physical medium, such a pins, air bladder, or putty that actuate to form a recognizable and representative contour of the first user (e.g., a remote user) to the second user. The one or more items actuate in response to control signals generated in response to image data received by the second special effects communication system 10B from the first special effects communication system 10A.

As depicted, the second special effects communication system 10B has already received at least a portion of the image data from the first special effects communication system 10A and has operated the one or more items to actuate under control or drive or control signals and based on the image data. In this way, the one or more items have created the three-dimensional representation of the first user. Additional sensor data may be used to track an orientation of the first user, and thus may be used to adjust one or more outputted control signals to suitably adjust the actuation of the one or more items in response to the motion. For example, a first user may orient themselves closer to the capturing system and thus may be presented in a different manner to the second user than when orientated or positioned further from the capturing system (e.g., to convey relative positioning).

Referring now to FIG. 4 with reference to FIGS. 2-3, the presentation example 50 may occur at the same time or a substantially similar time as the presentation example 28. In this way, the second special effects communication system 10B may capture and transmit image data, audio data, spatial data, and/or additional sensor data (e.g., via capture/display system 12B) to the first special effects communication system 10A at the same time as receiving similar datasets from the first special effects communication system 10A. Furthermore, the presentation example 50 may also occur at the same time as a special effect (or multiple special effects) of the first special effects communication system 10A.

Figure 5:
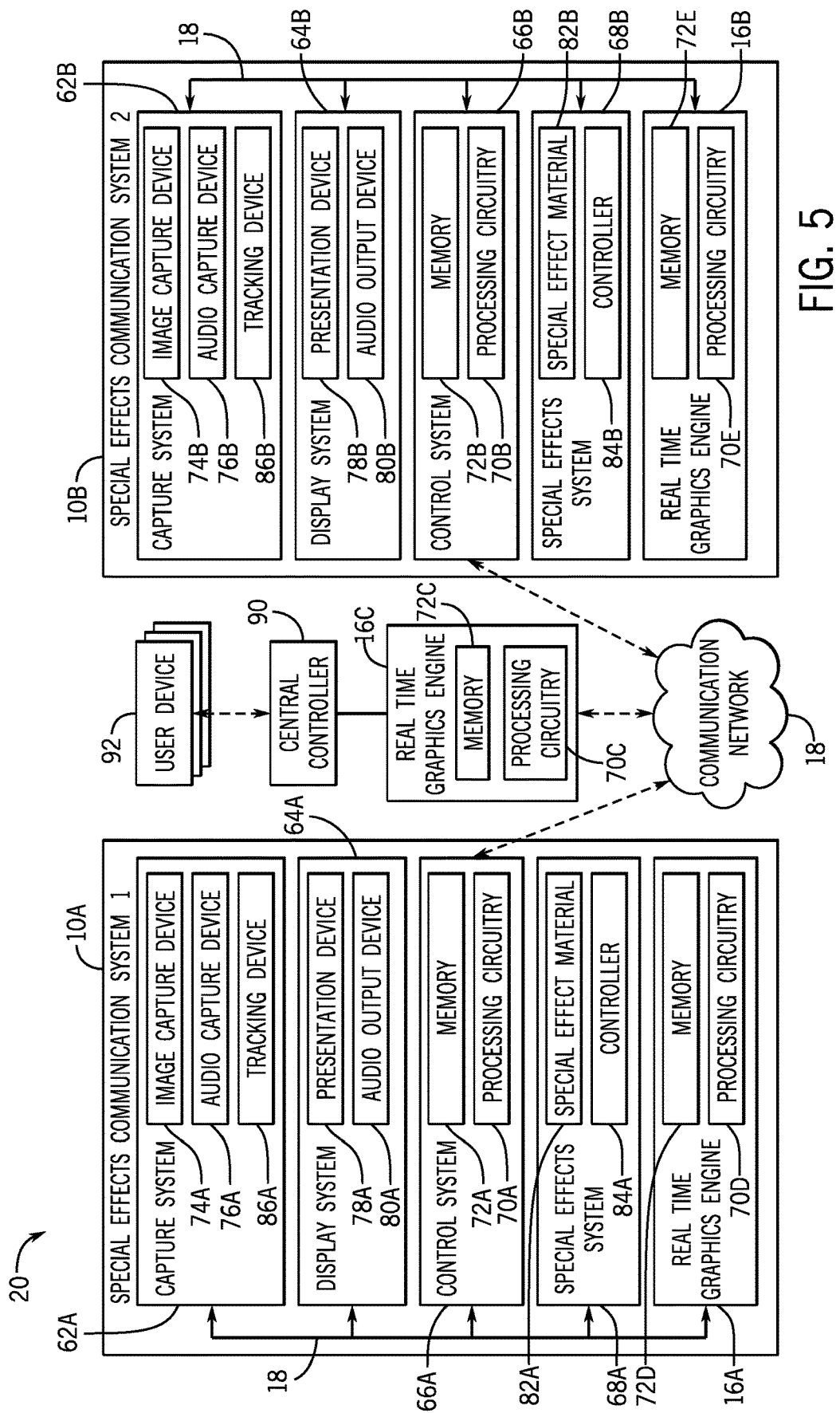
FIG. 5 is a block diagram of the special effects communication system of FIG. 1, in accordance with aspects of the present disclosure.

With the foregoing in mind, FIG. 5 is a block diagram of the special effects communication systems 10 (e.g., 10A, 10B). The special effects communication systems 10 include capture systems 62 (e.g., 62A, 62B), display systems 64 (e.g., 64A, 64B), control systems 66 (e.g., 66A, 66B), and special effect systems 68 (e.g., 68A, 68B). Each of these systems (e.g., 10, 62, 64, 66, 68) may communicate with each other via the communication network 18. Furthermore, data transmitted between the special effects communication systems 10 may be optionally processed by a real time graphics engine 16 and/or additional or alternative real time graphics engines either within and/or external to the special effects communication systems 10 end points.

As described earlier, the real time graphics engines 16 and the control systems 66 may include processing circuitry 70 (e.g., 70A, 70B, 70C) and memory circuitry 72 (e.g., 72A, 72B, 72C) to process the one or more datasets sent between the special effects communication systems 10. The processing circuitry 70 may be used to run programs, execute instructions, interpret input, generate control signals, and/or other similar functions, and may include a combination of hardware-based and/or software-based functions or applications to do so. The memory circuitry 72 may be used to store data, programs, instructions, diagnostic data and final datum, and so forth, in a variety of suitable memory or storage types, such as random-access memory, read-only memory, flash memory, a hard drive, future storage technologies both known and unknown at the current time (e.g., data storage on deoxyribonucleic acid (DNA), or the like), and so forth.

Datasets (e.g., audio data, image data, and additional sensor data) may be transmitted between components via a communication network 18. The communication network may include any number of input/output (I/O) interfaces and/or network interfaces. Such a communication network 18, as described earlier, may enable data transmission over a variety of wired or wireless networks. In this way, the datasets may be recorded or sensed in an analog or digital domain and transmitted between the special effects communication systems 10 in an analog or digital domain, or any combination thereof.

The control systems 66 may operate the capture systems 62, the display systems 64, and the special effects systems 68 to provide an immersive and/or transformative communication experience to a user. In this way, the control systems 66 may generate one or more control signals to respectively control various functions of the respective capture systems 62, the display systems 64, and the special effects systems 68. For example, the control system 66A may transmit one or more control signals to the special effects system 68A to cause performance of a special effect corresponding at least in part to the control signals.

Continuing onto describe each sub-system (e.g., capture systems 62, display systems 64, and special effects systems 68) of the special effects communication systems 10, the capture systems 62 may sense and record (e.g., capture) a likeness of a user (e.g., capture system 62A sensing the likeness of the first user). In this way, the control systems 66 may operate respective capture systems 62 to sense the likeness of the respective users. The control systems 66 may operate image capture devices 74 (e.g., 74A, 74B) to sense a visual likeness of the respective user (e.g., capture images). The datasets collected may not just include graphical information, but also may include datum corresponding to heat, volume, and/or shape of the respective user. The image capture devices 74 may be any suitable image capturing device such as a two-dimensional capturing system, a three-dimensional capturing system, a video capturing system, or the like. In response to sensing the visual likeness of the respective user, image data is transmitted from the capture system through the communication network 18 between the special effects communication systems 10. The control systems 66 may also operate audio capture devices 76 (e.g., 76A, 76B) to support audio transmission and capture associated with the respective user (e.g., record audio). The audio data associated with the user may be captured via any suitable audio recording device, such as a microphone. The audio capture device 76A may also include one or more beam steering microphone arrays to isolate external and/or environmental noises from the audio capture. For example, the beam steering microphone arrays may permit a user to communicate without interference from background noise. In some embodiments, data captured associated with the one or more beam steering microphone arrays may be used to present a spatial image, such as by suggesting an orientation of a user relative to the microphone.

For the display systems 64, the control systems 66 may operate presentation devices 78 (e.g., 78A, 78B) to communicate received image or other data. The presentation devices 78 may be any suitable display or system for manipulating physical material to essentially create a display or projection system. The presentation devices 78 may receive one or more control signals used to directly change or cause a presentation of an image via the presentation devices 78. The control signals may be generated by the control systems 66 or by sub-components of the display systems 64, such as driving circuitry responsive to received image data (not depicted). The control systems 66 may operate the presentation devices 78 substantially simultaneously with audio output devices 80 (e.g., 80A, 80B). The audio output devices 80 may be any suitable device that is capable of outputting audio (e.g., noise, sounds) in response to audio data, such as a speaker or tactile transducer. The combination of the presentation devices 78 and the audio output devices 80 provide the illusion that the image or likeness of the user being displayed is speaking, or that the presented image changes at a same speed as the audio output changes.

In addition, the control systems 66 may operate special effects systems 10 to provide a special effect corresponding to the audio data and the image or other data. As described above, the special effect may communicate, for example, an illusion that the first user is being actually transmitted into a physical medium for presentation to the second user. In this way, the special effect may facilitate providing an immersive and/or transformative illusion to both the first user and the second user. The immersive illusion may cause the first user to believe that they are really being transmitted into or out of the corresponding physical medium. For example, the first user may receive a heat illusion (e.g., warm air) if their likeness is being projected into a fire illusion or the first user may receive a cold water (e.g., cold air and mist) illusion if their likeness is being projected onto a water screen and/or physically formed out of a shaped water display. In this way, the special effect systems 10 may include special effects materials 82 (e.g., 82A, 82B) and controllers 84 (e.g., 84A, 84B). The controllers 84 may actuate or control components, such as valves, actuators, levels, or the like, to manipulate the special effect materials 82 to generate the special effect or special effect illusion. For example, water may be a special effect material 82A to generate a special effect illusion that the first user is being presented out of water to the second user.

In some embodiments, the control systems 66 may respectively control a tracking device 86 (e.g., 86A, 86B) to monitor an orientation or position of the first user and/or any objects that the first user is holding (e.g., an object held in a hand of the first user) to be transmitted to the second special effects communication system 10B. In response to receiving this additional sensor data, the control system 66B may operate the display or special effects system 64B (e.g., via one or more control signals) to change an output of the received data based on the additional sensor data to communicate the orientation or position of the first user (or second user) and/or associated objects possessed by the first user to the second user (or first user).

As may be appreciated, intensive processing may be used to provide an immersive and/or transformative communication experience. Similar to as described earlier, the real time graphics engine 16 and the control systems 66 may include processing circuitry 70 to process the one or more datasets sent between the special effects communication systems 10. In this way, some or all processing of the one or more datasets may be shared between the control systems 66 and the real time graphics engine 16. Thus, the first special effects communication system 10A may partially process a first dataset and the real time graphics engine 16 may finally process the first dataset before transmission onto the second special effects communication system 10B. Processing of the datasets may happen while data transmission continues. In this way, datasets are used to generate control signals in real-time and (e.g., to cause a special effect, to drive presentation of a likeness of a user via actuation or molding of physical material) between processing associated dataset generation and dataset presentation. In addition, the real time graphics engine 16 may be communicatively coupled (e.g., through a coupling similar or the same as the communication network 18) to a central controller 90. The central controller 90 may aggregate, process, interpret, or perform any other suitable action on datasets and/or inputs received from one or more user devices 92. Any suitable combination of memory or processing components may be included within the central controller 90. The user devices 92 may host and operate to present a variety of software applications or user interfaces to a person using the user device 92 to facilitate interaction with the special effects communication systems 10 through the communicative coupling to the central controller 90. For example, a user through the user device 92 may operate the device to change an illusion or distortion used by the first special effects communication system 10A in transmitting the likeness of the participant to the second special effects communication system 10B which may also have a user device. In this way, the special effects communication systems 10 may permit a first user to change an illusion they experience or transmit as in addition to permitting a second user to change an illusion they experience and/or transmit as, where the illusions may not be the same or related illusions. Although not depicted as such, each special effects communication system 10 may have a respective user device of the user devices 92 associated with it (e.g., a user device belonging to the first user, a user device belonging to the second user, a user device physically disposed on or within the special effects communication systems 10 but accessible by the first user and/or the second user). Thus, this technology may permit substantially simultaneous, multidirectional, full duplex communication between multiple devices, such as between a first user device and the first special effects communication system 10A and simultaneously between a second user device and the second special effects communication system 10B to simultaneously permit altering of an appearance of the second user and/or the first user.

Figure 6:
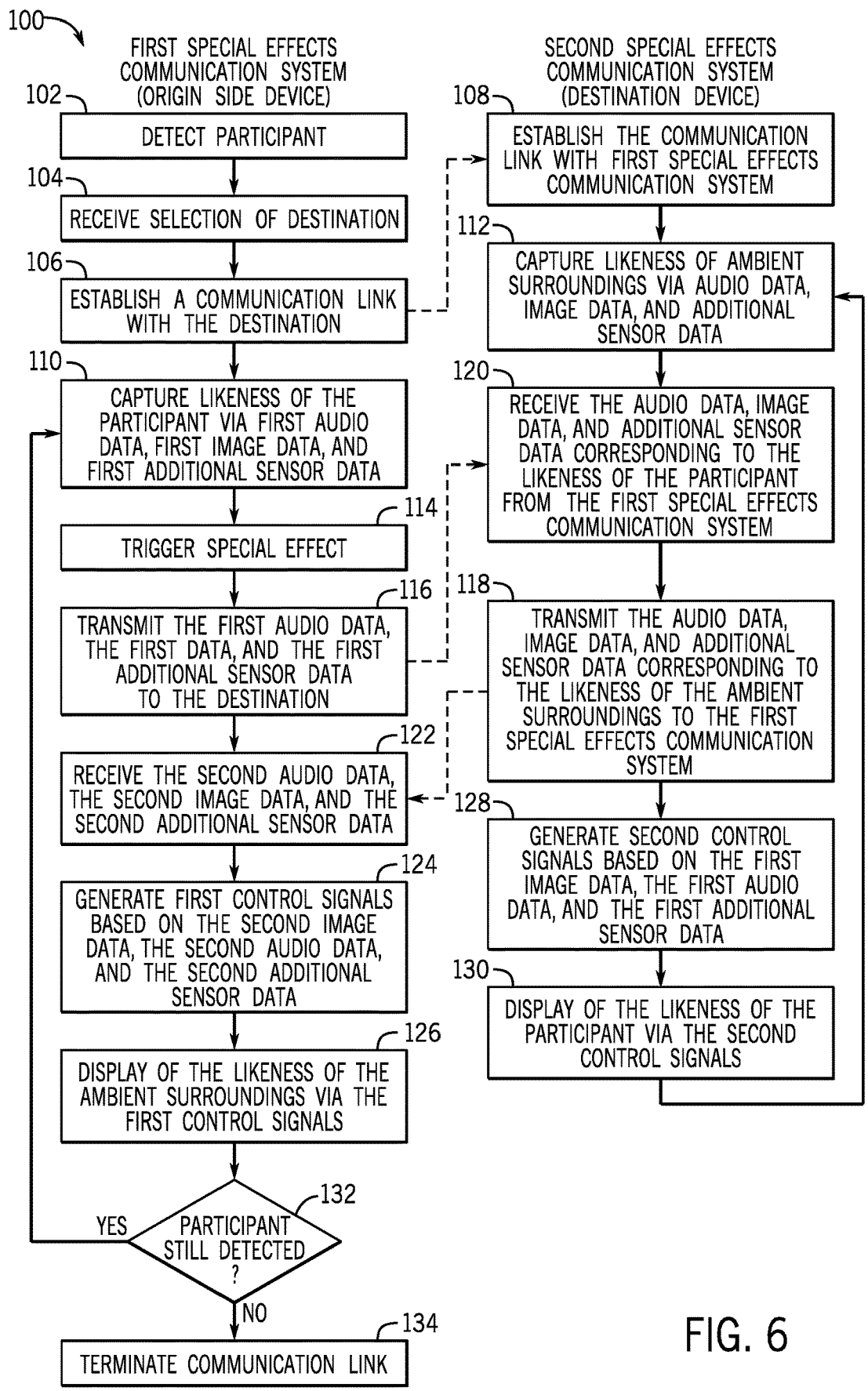
FIG. 6 is a flow diagram of a process for providing an immersive and/or transformative communication system, in accordance with aspects of the present disclosure.

FIG. 6 is a flow diagram of a process 100 for providing an immersive and/or transformative communication system and is presented with reference to FIGS. 1-5. Although the process 100 is described below as being performed by the first special effects communication system 10A and/or the second special effects communication system 10B, it should be understood that the process 100 may be performed by other components of the system 20 as provided herein. Moreover, although the following description of the process 100 is described in a particular order, it should be noted that the process 100 may be performed in any suitable order.

At block 102, the control system 66A of the first special effects communication system 10A detects a participant. The control system 66A may detect a participant (e.g., the first user) in response to sensor data received or via another suitable method. For example, ultrasonic sensors, light sensors, pressure pads, or the like, may be used within a physical space of the first special effects communication system 10A (e.g., being present inside an origin device) to detect when a user enters the physical space of the first special effects communication system 10A. Furthermore, detection may occur in response to a triggering based on physical matter, props, or materials detected (e.g., recognized) by the control system 66A. A user entering the first special effects communication system 10A may be detected in response to partial or full body entering into the space. For example, in some embodiments, a user may place their head, whole body, or different portion of their body into a physical space of the first special effects communication system 10A. In some embodiments, the first special effects communication system 10A may detect a participant through receiving an initiation input from a computing device associated with the participant and/or via an input device associated with the first special effects communication system 10A. The initiation input may indicate to the control system 66A to start a call or communication with one or more destination devices. Furthermore, the central controller 90 may transmit one or more initiation inputs to the control system 66A to start communication operations.

The first special effects communication system 10A, at block 104, may receive a selection of a destination (e.g., destination device). The selection of the destination may be received via user actuation of an input device, such as a dial, voice control, touchpad, button, or the like, to communicate to the first special effects communication system 10A which of multiple destinations the user wishes to communicate with. In some embodiments, the first user may select the destination via a graphical, spatial, and/or physical user interface presented on a display device, where the graphical user interface may contribute to enhancing the user experience by, for example, matching a particular theme corresponding to the communication illusion. The destination is where the likeness of the first user is to be transmitted to from an origin device (e.g., the first special effects communication system 10A). In some embodiments, the second special effects communication system 10B may operate to transmit audio data, image data, and any additional sensor data to the first special effects communication system 10A regardless of there being a participant using the second special effects communication system 10B. Furthermore, in some embodiments, more than one selections of destinations may be made, such that the likeness of the first user is transmitted to multiple destinations and/or is permitted to experience multiple destinations simultaneously. As described herein, the second special effects communication system 10B may transmit a likeness of an ambient surrounding (e.g., ambient environment) with or without a second user.

In response to the selection of the destination, at block 106, the first special effects communication system 10A establishes a communication link with the destination, and at block 108, the second special effects communication system 10B (e.g., the destination) reciprocates to establish the communication link. In some embodiments, a broadcast channel may be used to transmit datasets between the special effects communication systems 10, and thus the communication link may be provided through wired (e.g., twisted-pair wire, cable, fiber-optic cable) or wireless (e.g., microwave, satellite, radio, infrared) communication mediums. Through the communication link, the respective special effects communication systems 10 (e.g., 10A, 10B) may transmit and receive image data, audio data, and any additionally gathered data to communicate likenesses of users of the special effects communication systems 10. Any suitable method of communicative linking may be used including techniques involving wiring, wireless transmission, communication buses, fiber optics, or the like and future technologies not yet known. The establishing of the communication link enables the special effect communication systems 10 to transmit data through the communication network 18.

At block 110, first special effects communication system 10A captures the likeness of the participant using the capture system 62A. Capturing the likeness of the participant includes recording, collecting, and transmitting audio data corresponding to speech or sound emitted from the participant via the audio capture device 76A, gathering image and/or spatial data corresponding to a visual appearance of the participant via the image capture device 74A, and measuring any additional sensor data, such as position or orientation data via the tracking device 86A, to further enhance the likeness of the participant at presentation via the second special effects communication system 10B. Similarly at block 112, the second special effects communication system 10B captures the likeness of the ambient surroundings with or without a second participant using the capture system 62B. The datasets generated by the capture system 62B may communicate the ambient surroundings, and any sounds, sights, or other data associated with the ambient surroundings, to the first special effects communication system 10A. Any suitable image capturing, audio capturing, and/or data capturing device may be used including microphones, recorders, two-dimensional capture systems, three-dimensional capture systems, video capture systems, thermal capture systems, or the like.

At block 114, the first special effects communication system 10A triggers a special effect for the participant to experience via the special effects system 68A. The special effect may relate to a physical medium used in projection or production of the likeness of the first user in the second special effects communication system 10B, an environmental aspect of the ambient surrounding of the second special effects communication system 10B, an environmental aspect to the ambient surroundings of the first special effects communication system 10A to further enhance the capturing of the likeness of the participant, or the like. The special effect may enhance and further immerse or transform the participant into the communication with the second special effects communication system 10B. For example and as described above, a participant communicating with a second special effects communication system 10B that projects or generates the participant likeness out of actuations of fog and/or water may use the special effects system 68A to trigger (e.g., initiate, start, present) a cold-temperature related special effect, such as a light breeze special effect, a cooling mist special effect, cold air blowing special effect, or the like, to immerse the participant into the medium of the second special effects communication system 10B. In some embodiments, the second special effects communication system 10B triggers and presents the special effect to the ambient surrounding, including any participant of the second special effects communication system 10B through the special effects system 68B.

At block 116, the first special effects communication system 10A transmits the image data, audio data, and additional sensor data measured, recorded, or gathered at the block 110 to the second special effects communication system 10B. At block 118, the second special effects communication system 10B transmits the image data, audio data, and additional sensor data measured, recorded, or gathered at block 112 to the first special effects communication system 10A. These transmission activities may happen substantially simultaneously to each other and in this way, the special effects communication systems 10 may achieve real-time communication between participants and/or ambient surroundings.

At block 120, the second special effects communication system 10B receives the image data, audio data, and the additional sensor data captured by the first special effects communication system 10A. At block 122, the first special effects communication system 10A receives the image data, audio data, and the additional sensor data captured by the second special effects communication system 10B. In this way, the special effects communication systems 10 communicates likeness of participants and/or ambient surroundings in real-time. The datasets are transmitted via the communication network 18.

In response to receiving the datasets, at block 124, the first special effects communication system 10A generates one or more destination control signals to communicate the ambient surroundings of the destination to the participant. The destination control signals are generated by the first special effects communication system 10A in response to datasets transmitted from the second special effects communication system 10B. Thus, the one or more control signals may correspond to control signals used to display image data, such as pixel control signals, programming voltages to cause light emission based on image data, or control signals used to drive a physical manipulation of a physical medium, such as to generate a projection surface to project via light projection the visual likeness of the ambient surroundings. Control signals may include any suitable signal to permit audio emission according to the audio data and/or any suitable signal to permit the additional sensor data to be used in communicating the likeness of the ambient surroundings to the participant. These control signals are used, at block 126, by the first special effects communication system 10A to drive a system to display ambient surroundings of the destination via the destination control signals.

Similarly, at block 128, the second special effects communication system 10B generates one or more control signals based on image data, audio data, and addition sensor data received from the first special effects communication system 10A. The one or more control signals may be used, at block 130, by the second special effects communication system 10B to drive three-dimensional manipulation of physical media to display the likeness of the participant using the first special effects communication system 10A. After presenting the likeness of the participant, the second special effects communication system 10B continues onto block 112 to repeat the capturing of the likeness of the ambient surroundings to the second special effects communication system 10B. This capturing and presentation operation may continue until the first special effects communication system 10A does not detect the participant or is issued a stop command via a control signal. In some embodiments, any time delays in communication caused by the first special effects communication system 10A determining if a participant is still active may be compensated for with processing of the datasets to continue to provide the illusion of real-time, immersive and/or transformative communication.

At block 132, the first special effects communication system 10A determines whether the participant is still detected. The first special effects communication system 10A may detect the participant in a variety of ways discussed in reference to the block 102. Thus, to determine whether the participant is still detected, the first special effects communication system 10A may analyze specific sensor outputs or readings, or may analyze or determine a change in output, or may detect a state change as part of a process to determine if the participant is still detected. If the participant is still detected, the first special effects communication system 10A may repeat a portion of the process 100 at the block 110 to capture the likeness of the participant.

However, in response to not detecting the participant, at block 134, the first special effects communication system 10A may terminate the communication link with the second special effects communication system 10B to end communication. In response to the termination of the communication link, the second special effects communication system 10B may terminate capturing of the likeness of the ambient surroundings and the first special effects communication system 10A may terminate capturing of the likeness of the participant. In addition, certain operations may be performed to reduce or eliminate a special effect residual property from the physical space of the first special effects communication system 10A. For example, the first special effects communication system 10A may operate to eliminate or reduce residual mists, fogs, smoke, or the like from the physical space of the first special effects communication system 10A to give a next participant a neutral entrance experience to the first special effect communication system 10A. In this way, a second participant (e.g., the next participant) may not experience a previous ambient surrounding associated with an original selected destination. In some embodiments, the second special effects communication system 10B may also reduce or eliminate a special effect residual property from a physical space of the second special effects communication system 10B.

As described above, the special effects communication systems 10 permit immersive and transformative communication between one or more participants with one or more additional participants or an ambient surrounding. In this way, two-dimensional (2D) to 2D, 2D to three-dimensional (3D), 3D to 2D, 3D to 3D, or any suitable communication is valid through these techniques. Thus, a captured 2D image or video of a participant may be projected onto a generally 2D surface (e.g., a fog curtain), projected out of or within a generally 2D surface (e.g., a likeness formed out of selective actuation of water jets, such that negative space of the water curtain form the likeness of the participant), projected in a 2D surface (e.g., projected out of light from pixels), projected onto a 3D surface (e.g., light projection onto a 3D fog sphere such that the likeness of the participant appears 3D within the fog sphere), projected via manipulation of physical medium or a 3D material (e.g., participant likeness formed from varying intensities of fire, fog, water, or the like projected into a generally 3D volume, or formed from actuation of putty or pins to cause a 3D likeness to emerge from a flat surface), or the like. In addition, it should be appreciated that a projection material (e.g., projection surface, projection plane) may be a static or dynamic material and/or may appear static or dynamic to a view of the projection material. The physical medium may also be simulated to appear to be a different physical medium using practical, visual, and/or theatrical effects. For example, a cone of fog or a fog projection screen may generate a fire illusion through using visual and theatrical effects (e.g., audio and visual special effects). In sum, the projection and/or display surfaces used by the display systems 64 may be any suitable impression-based material or system, any suitable flat presentation system, and/or any suitable volumetric projection system. In addition, in some embodiments, the display systems 64 may use at least in part specialized privacy films or filters over a presented image (e.g., media), limited view displays, virtual reality goggles, specialized lensing, or other theatrical effects. These display enhancements and features may also be used and applied to the audio signal allowing for localized sound, which may aid privacy considerations. These additional features may help at least in part to align a first user into a desired capturing position, such as with respect to the capture system 62A.

In some embodiments, additional components, such as mirrors or other reflective surfaces, may be included within or adjacent to the special effects communication systems 10 as a way to hide or conceal or enhance, distort or duplicate components of the special effects communication systems 10. In this way, the first special effects communication system 10A may be concealed from a first user while the first user is within the physical space of the device (e.g., using the first special effects communication system 10A). Concealing one or more of the special effects communication systems 10 may improve a user experience further relative to not concealing the devices. Furthermore, in some embodiments, facial recognition, voice recognition, content curation (e.g., speech-to-text, text-to-speech), and/or speech detection for censoring of content (e.g., slang or foul language prevention) may also be used to enhance user experiences. Furthermore, one or more sensors have been described herein, however, it should be understood that any suitable sensor may be used in the special effect communication systems to provide an immersive and/or transformative communication experience including thermal sensors, spatial sensors, ultrasonic sensors, infrared sensors, or the like.

With the foregoing in mind, in some embodiments, the special effects communication systems 10 permit subscriber-less broadcast that permits the first special effects communication system 10A to communicatively link to one or more other special effects communication systems 10 to receive one or more calls. In addition, to reiterate, the techniques described above in some embodiments may permit a first user of the first special effects communication system 10A to initiate a call to one or more other special effects communication systems 10 without a second, third, and so on additional users being within or near to the one or more other special effects communication systems 10. In some embodiments, the special effects communication systems 10 permit conference callings and/or multi-point communication, where one or more users associated with the special effects communication systems 10 may each interact with, see visually and/or communication with one or more other users at substantially the same time.

In addition, although the process 100 is described as ending with a first user terminating the communication link, it should be understood that additional or alternative events may terminate the communication link. For example, the second user of the second special effects communication system 10B may decide to terminate the communication link (e.g., hang up or not answer a call from the first special effects communication system 10A in the first place). As an additional example, the central controller 90 may terminate the communication link. In some embodiments, the communication link may immediately terminate regardless of at what point the process 100 is executed at.

Technical effects include improvements to communication systems by improving an ability of a communication system to provide an immersive and/or transformative communication experience. Techniques to provide a special effect while transmitting and receiving data corresponding to participant likenesses may enhance user experiences by enabling a user to experience an ambient surrounding of a destination device they communicate with. The improved communication system may also permit simultaneous driving of physical medium at a destination communication system during a communication link, such as to permit actuation of a three-dimensional presentation of one or more of the participants.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f)

The invention claimed is:

1. A special effects communication system, comprising:
    a camera system configured to generate a first dataset based on one or more images or impressions of a first user at a first location when the first user is present at the first location; and
    a control system communicatively coupled to the camera system, wherein the control system is configured to:
        transmit the first dataset to a destination device;
        receive a second dataset from the destination device or from memory, wherein the received second dataset comprises image data generated by a capture of one or more images or impressions of a second user at a second location;

generate one or more control signals based on the received second dataset; and transmit the one or more control signals to a component that manipulates a special effects material at the first location in response to the one or more control signals, wherein the one or more control signals are configured to cause the component to generate special effects to form a representative contour of the second user from the manipulation of the special effects material at the first location.

2. The special effects communication system of claim 1, wherein the special effects material comprises fire, lasers, plasma, electricity, air, water, fog, putty, sand, flexible or shape forming material, or any combination thereof.

3. The special effects communication system of claim 1, wherein the component presents the one or more images or impressions of the second user onto the special effects material to present an additional image of the second user.

4. The special effects communication system of claim 3, wherein the component generates a fog screen or a water screen onto which the one or more images or impressions of the second user are projected.

5. The special effects communication system of claim 1, wherein the component forms the representative contour of the second user using the special effects material to present the representative contour of the second user.

6. The special effects communication system of claim 1, wherein the component is configured to drive a physical manipulation of the special effects material that molds a three-dimensional image of the second user out of the special effects material.

7. The special effects communication system of claim 1, wherein the control system is configured to extract identifiable features in the one or more images or impressions of the second user from the received second dataset, and wherein the representative contour of the second user is based on the extracted identifiable features.

8. The special effects communication system of claim 7, wherein the control system is configured to manipulate or distort the extracted identifiable features based on a characteristic of the special effects material, and wherein the representative contour of the second user is based on the manipulated or distorted identifiable features.

9. The special effects communication system of claim 1, comprising an audio capture device configured to record audio data corresponding to the first user, wherein the first dataset comprises the audio data.

10. The special effects communication system of claim 1, wherein the first dataset is transmitted through a communication link, and wherein the control system is configured to:
detect the first user; and
establish the communication link with the destination device, a broadcast channel, or any combination thereof in response to detecting the first user.

11. A special effects communication system, comprising:
a first communication circuit configured to transmit a first dataset to a second communication circuit at a second location and to receive a second dataset from the second communication circuit, wherein the first dataset comprises first data generated based at least in part on an image, or an impression, or both of a first user in response to a determination that the first user is present at a first location, and wherein the received second dataset comprises second data generated based at least in part on an image, or an impression, or both of a second user; and a special effects system configured to generate one or more control signals based on the received second dataset to drive three-dimensional manipulation of a physical medium at the first location to form a representative contour of the second user from the three-dimensional manipulation of the physical medium.

12. The special effects communication system of claim 11, wherein the physical medium comprises fire, lasers, plasma, electricity, air, water, fog, putty, sand, flexible or shape forming material, or any combination thereof.

13. The special effects communication system of claim 11, comprising a control system and one or more sensors, wherein the control system is configured to determine that the first user is present at the first location at least in part by:
generating a control signal to operate the one or more sensors to perform a sensing operation;
transmitting the control signal to the one or more sensors;
receiving sensing data from the one or more sensors, wherein the sensing data resulted from the sensing operation; and
determining that the first user is present at the first location based at least in part on the sensing data.

14. The special effects communication system of claim 13, wherein the one or more sensors comprise a thermal sensor, a temperature sensor, an image sensor, a spatial sensor, an ultrasonic sensor, an infrared sensor, a pressure sensor, or any combination thereof.

15. The special effects communication system of claim 11, comprising a destination device that includes the second communication circuit, wherein the destination device comprises an additional special effects system configured to generate special effects based on the first dataset, and wherein the special effects are generated at least partially by using a special effects material.

16. The special effects communication system of claim 15, wherein the special effects comprises a wind effect, and wherein the special effects material comprises air having a different temperature than an ambient temperature.

17. The special effects communication system of claim 11, wherein the special effects system is configured to generate special effects based on the received second dataset, wherein the special effects comprise an environmental effect, and wherein the physical medium comprises air having a different temperature than an ambient temperature.

18. A method, comprising:
receiving a first dataset using a communication link, wherein the received first dataset comprises first audio data and first image data, or first impression data, or both associated with a first location;
generating one or more control signals based at least in part on the received first dataset; and
transmitting the one or more control signals to a controller configured to drive a three-dimensional manipulation of a physical medium to form a representative contour from the physical medium based on the received first dataset.

19. The method of claim 18, comprising:
generating a second dataset based at least in part on second audio data and second image data, or second impression data, or both associated with a second location;
receiving a selection of a destination;
establishing the communication link based on the selected destination; and transmitting the second dataset over the communication link.

20. The method of claim 19, wherein generating the second dataset comprises:
   performing content curation operations on the second audio data;
   removing data from the second audio data in response to the content curation operations; and
   generating the second dataset to include at least a portion of the second audio data and exclude the removed data.

21. The method of claim 18, comprising:
   receiving a third dataset after transmitting the one or more control signals, wherein the received third dataset comprises additional sensor data indicative of a movement of a user, or of an object, or of both at the first location;
   generating additional control signals based at least in part on the received third dataset; and
   transmitting the additional control signals to the controller, wherein the controller is configured to adjust the three-dimensional manipulation of the physical medium based on the movement indicated by the additional sensor data in response to the additional control signals.

22. The method of claim 18, comprising:
   receiving an initiation input from an input device, or from a senor, or from both;
   receiving a selection input of an indication of the first location from a plurality of locations, wherein the first location is one location of the plurality of locations;
   establishing the communication link with a communication circuit associated with the first location in response to the selection input; and
   in response to receiving the first dataset over the communication link, performing content curation operations on the first audio data.

* * * * *